United States Patent
Whitmore

(10) Patent No.: US 11,449,605 B2
(45) Date of Patent: Sep. 20, 2022

(54) SYSTEMS AND METHODS FOR DETECTING A PRIOR COMPROMISE OF A SECURITY STATUS OF A COMPUTER SYSTEM

(71) Applicant: Capital One Services, LLC, McLean, VA (US)

(72) Inventor: Jon Whitmore, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 155 days.

(21) Appl. No.: 16/846,477

(22) Filed: Apr. 13, 2020

(65) Prior Publication Data
US 2021/0319095 A1 Oct. 14, 2021

(51) Int. Cl.
*G06F 21/55* (2013.01)
*G06F 21/62* (2013.01)
*G06F 16/14* (2019.01)

(52) U.S. Cl.
CPC .......... *G06F 21/554* (2013.01); *G06F 16/148* (2019.01); *G06F 21/552* (2013.01); *G06F 21/629* (2013.01); *G06F 2221/034* (2013.01)

(58) Field of Classification Search
CPC .... G06F 21/554; G06F 16/148; G06F 21/552; G06F 21/629; G06F 2221/034
See application file for complete search history.

(56) References Cited

U.S. PATENT DOCUMENTS

| 9,742,901 B2 | 8/2017 | Ye et al. |
| 2014/0032758 A1* | 1/2014 | Barton .................. G06F 21/629 709/225 |
| 2014/0173733 A1 | 6/2014 | Ford |
| 2021/0136115 A1* | 5/2021 | Andrews ................. H04L 63/20 |

OTHER PUBLICATIONS

Trelis. iOS Pentesting—Reversing Jailbreak. Trelis Blog, Mar. 12, 2019 [retrieved on Nov. 6, 2021], <URL: https://trelis24.github.io/2019/03/12/Pentesting-iOS-Reversing-Jailbreak/>. 12 Pages. (Year: 2019).*

Bouchard. Pro tip: clean up leftover preference files after uninstalling jailbreak tweaks. DownloadBlog, Aug. 9, 2016 [retrieved on Nov. 6, 2021], <URL: https://trelis24.github.io/2019/03/12/Pentesting-iOS-Reversing-Jailbreak/>. 16 Pages. (Year: 2016).*

(Continued)

*Primary Examiner* — Carl G Colin
*Assistant Examiner* — Zhe Liu
(74) *Attorney, Agent, or Firm* — Bookoff McAndrews, PLLC

(57) ABSTRACT

A computer-implemented method for detecting a security status of a computer system may include: in response to satisfaction of a predetermined trigger condition associated with an electronic application installed on a memory of the computer system, performing a security check process on the computer system; in response to the security check process determining that a security status of the computer system is currently compromised, performing a first security action; and in response to the security check process determining that the security status is formerly compromised, performing a second security action.

9 Claims, 4 Drawing Sheets

(56) References Cited

OTHER PUBLICATIONS

Trelis. iOS Pentesting—Reversing Jailbreak. Trelis Blog, Mar. 12, 2019 [retrieved on Nov. 6, 2021], <URL: https://trelis24.github.io/2019/03/12/Pentesting-iOS-Reversing-Jailbreak/> (Year: 2019).*

Bouchard. Pro tip: clean up leftover preference files after uninstalling jailbreak tweaks. Download Blog, Aug. 9, 2016 [retrieved on Nov. 6, 2021], <URL: https://trelis24.github.io/2019/03/12/ Pentesting-iOS-Reversing-Jailbreak/> (Year: 2016).*

Choudhary. Best way to check if your iOS App is running on a Jailbroken Phone. Developer Insider, Feb. 23, 2020 [retrieved on May 10, 2022], <URL: https://developerinsider.co/best-way-to-check-if-your-ios-app-is-running-on-a-jailbroken-phone/> (Year: 2020).*

Is there any updated check for jailbroken devices (in swift or Objective-C). Apple Developer Forums, 2020 [retrieved on May 10, 2022], <URL: https://developer.apple.com/forums/thread/119491> (Year: 2020).*

Kellner et al. False Sense of Security: A Study on the Effectivity of Jailbreak Detection in Banking Apps. 2019 IEEE European Symposium on Security and Privacy (Euro & P), Jun. 1, 2019, p. 1-14 (Year: 2019).*

\* cited by examiner

SYSTEMS AND METHODS FOR DETECTING A PRIOR COMPROMISE OF A SECURITY STATUS OF A COMPUTER SYSTEM

TECHNICAL FIELD

Various embodiments of the present disclosure relate generally to software security, and relate particularly to methods and systems for detecting a prior compromise of a security status of a computer system.

BACKGROUND

Typically, computer systems include an operating system that sequesters various functionalities, privileges, and/or files behind authorizations, permissions, or the like. For example, certain files or actions may be accessible to an administrator level user, but restricted from a lower level user. In another example, an executable file, e.g., an electronic application, may be granted permission to access and/or modify certain files, but may be restricted from accessing and/or modifying others.

Such protections may be used to inhibit unauthorized changes to the operating system and/or other files on the computer system. However, in some instances, users may desire to enact unauthorized changes to the operating system or an electronic application on the computer system. As a result, techniques have been developed to defeat and/or circumnavigate systems of permissions and protections typically included in the operating system of a computer system. Such techniques, however, may leave a computer vulnerable to a malicious attack and/or unintended consequences of unauthorized modifications that may impact performance or operability of the computer system or the electronic application.

As a result, some electronic applications have been developed that are configured to determine whether a security status of the computer system is currently compromised, and to limit or prevent access to a functionality of the electronic application and/or other aspects of the computer system in response to such a determination. However, in some instances, a technique to compromise the security status of the computer system may be reversed after a modification to the computer system and/or the electronic application has been made. In such instances, the security status of the computer system may appear to be un-compromised, despite that the computer system and/or electronic application may have been modified so as to be in a compromised state. Conventional techniques do not provide information on whether the security status of a computer system that is currently un-compromised was formerly compromised.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, methods, systems, and non-transitory computer-readable media are disclosed for detecting a security status of a computer system.

Each of the examples disclosed herein may include one or more of the features described in connection with any of the other disclosed examples.

In one example, an exemplary embodiment of a computer-implemented method for detecting a security status of a computer system may include: in response to satisfaction of a predetermined trigger condition associated with an electronic application installed on a memory of the computer system, performing a security check process on the computer system; in response to the security check process determining that a security status of the computer system is currently compromised, performing a first security action; and in response to the security check process determining that the security status is formerly compromised, performing a second security action.

In another example, an exemplary embodiment of a system for detecting a security status of a computer system may include: a memory storing instructions and an electronic application; and a processor operatively connected to the memory and configured to execute the instructions to perform acts. The acts may include: in response to satisfaction of a predetermined trigger condition associated with an electronic application installed on a memory of the computer system, performing a security check process on the computer system, the security check process including: determining whether an indicator application is present on the memory of the computer system; in response to determining that the indicator application is present on the memory, determining that a security status of the computer system is currently compromised; in response to determining that the indicator application is not present on the memory, determining whether an indicator directory is accessible on the memory; and in response to determining that the indicator directory is accessible on the memory, determining that the security status of the computer system is formerly compromised; in response to the security check process determining that the security status of the computer system is currently compromised, performing a first security action; and in response to the security check process determining that the security status is formerly compromised, performing a second security action.

In a further example, an exemplary embodiment of a method for detecting a security status of a computer system may include: in response to satisfaction of a predetermined trigger condition associated with an electronic application installed on a memory of the computer system, performing a security check process on the computer system, the security check process including: determining whether an indicator application is present on the memory of the computer system, wherein the indicator application is "cydia.app" or "sileo.app"; in response to determining that the indicator application is present on the memory, determining that a security status of the computer system is currently compromised; in response to determining that the indicator application is not present on the memory, determining whether an indicator directory is accessible on the memory by performing a search process on the memory to identify at least two indicator directories in the memory, wherein the at least two indicator directories include "/etc/apt" and "/private/var/lib/apt/"; and in response to determining that the indicator directory is accessible on the memory, determining that the security status of the computer system is formerly compromised; in response to the security check process determining that the security status of the computer system is currently compromised, performing a first security action; and in response to the security check process determining that the security status is formerly compromised, performing a second security action.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
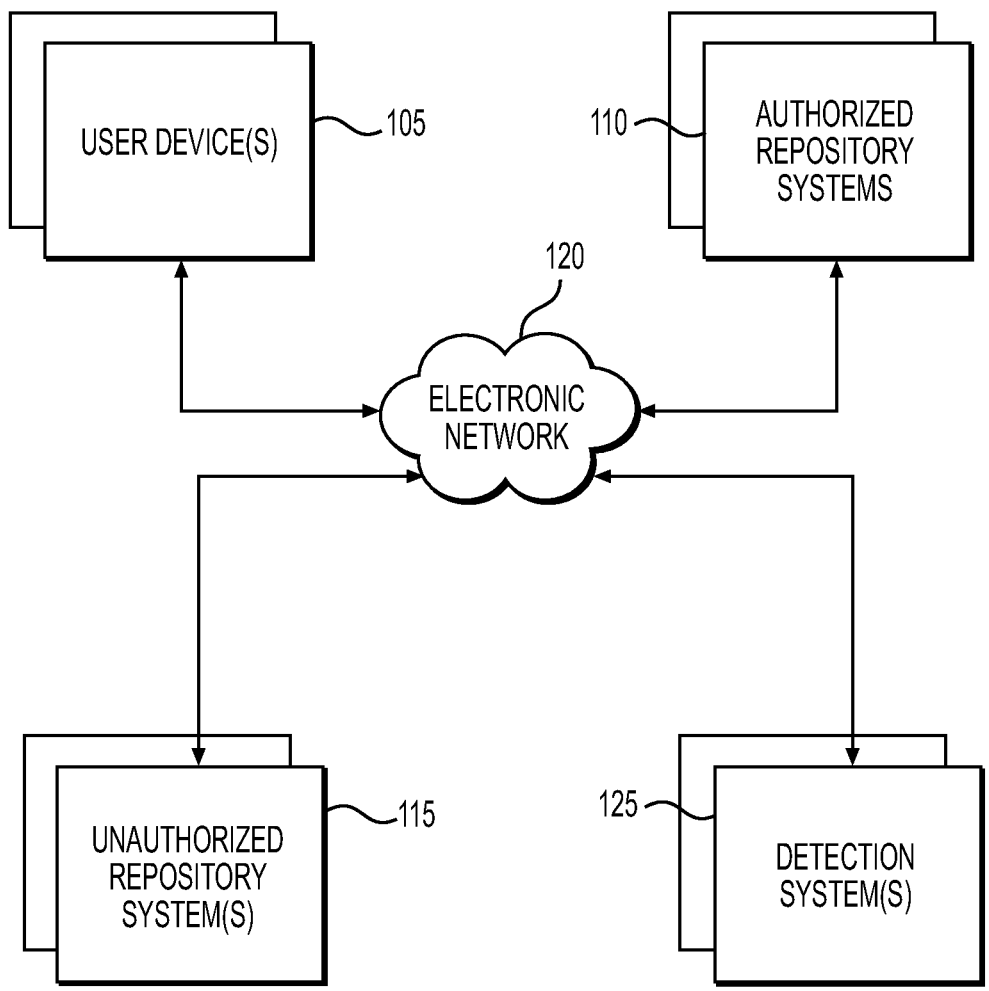
FIG. 1 depicts an exemplary client-server environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the terms "computer system," "server system," "user device," or the like generally encompass any device or combination of devices, each device having at least one processor that executes instructions from a memory medium. Additionally, a computer system may be included as a part of another computer system. A "mobile device" generally encompasses a computer system that is portable, and that may be configured to communicate with other devices over an electronic network such as a telecommunications network or the Internet. An "electronic application" generally encompasses an executable file or files that may be added and/or installed onto a computer system to enable the computer system to perform associated functionality.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In general, the present disclosure provides methods and systems for software security, and more particularly to detecting a prior and/or former compromise in and/or of a security status of a computer system. As will be discussed below in more detail, in methods and systems according to the present disclosure, existing techniques may be improved.

A security system of permissions, authorizations, or the like on a computing system may be used not only to protect the computer system from malicious attack and protect the computer system from being unintentionally modified in a manner that impacts performance or operability, but also to protect the integrity of electronic applications that may be installed on the computer system. In one example, mobile devices like cellular telephones or tablet computers are generally developed as closed platforms in which only authorized electronic applications may be installed, and in which many aspects of the operating system and/or the electronic application are restricted from being changed by the user. Although such measures may help secure the mobile device, another consequence may be that users may desire to install electronic applications or make modifications to an electronic application and/or the operating system of the mobile device that they are not authorized or permitted to do.

Techniques have been developed to defeat and/or circumnavigate systems of permissions and protections typically included in the operating system of a computer system. Such a technique may be typically referred to as a "jailbreak," and a device with compromised security protections may be typically referred to as "jail broken," in that users and files are no longer confined within the scheme of limited access and permissions intended by the provider of the computer system. In particular, the user and/or executable files on the mobile device are able to access and/or modify other files that may have previously been restricted.

A jailbreak might be used to make various modifications to an electronic application such as, for example, a simple color change, or an addition or replacement of an application feature. In some instances, the modification may be executed intentionally by the user of the computer system. In some instances, the modification may be performed maliciously by an entity or person seeking to compromise the mobile device and/or the electronic application. Although operating systems generally include measures to protect against such intrusions, such protections are generally disabled via the jailbreaking process. In other words, by jailbreaking a device in order to make unauthorized modifications, a user may make their device more vulnerable to malicious attack.

For example, a jailbreak may enable access to sensitive data associated with the electronic application. This could include retrieving such sensitive data and/or retrieving information about the electronic application usable to form or utilize vulnerabilities to the electronic application, even when executed on an un-jailbroken device. In an example, an electronic application may be associated with personally identifying information, financial information, or other confidential information. When the electronic application is installed and/or executed on a jailbroken device, not only may such sensitive information of the user of the device be put at risk, but also the integrity of the electronic application may be compromised so as to put the sensitive information of other users at risk as well, even though such users may not have performed a jailbreak on their devices.

Techniques have been developed to identify whether a user device is jailbroken. In some instances, such a technique may be used to restrict or prevent access to a functionality of an electronic application or file in response to a determination that the user device is jailbroken. However, as noted above, in some instances, a computer system may be jailbroken so as to introduce a modification to an electronic application and/or the computer system, and then the jailbreak of the computer system may be reversed. As a result, techniques that rely on the current security state of the computer system may determine that the computer system is not currently compromised, and thus the unauthorized modification to the computer system and/or the electronic application may go undetected.

In an exemplary use case that applies techniques presented herein, a user device, e.g., a cellular phone, associated with a user includes an electronic application that includes sensitive information, e.g., an electronic banking application. The user device was previously jailbroken, and thus the user device had an operating system with a compromised security status. While the security status was compromised, an unauthorized modification to the electronic application was enacted. The security status of the user device was then restored to an un-compromised state, e.g., by the user, and/or in response to an instruction from an automated process associated with the jailbreak, or the like. Thus, the user device then contained the electronic application with the unauthorized modification, despite the current security status of the user device being un-compromised. A portion of a detection system (e.g., an executable file, an electronic detection application, or the like), in response to a predetermined trigger condition such as the user device receiving an instruction to execute the electronic application, performs a security check process to determine whether the user device has a security status that was formerly compromised, and then performs a corresponding security action based on the determination. As used herein, "formerly" generally encompasses a state that once was, but no longer is. In response to determining that the security status of the user device was formerly compromised, the detection system performs a security action. Additional aspects of the disclosure are discussed in further detail below.

FIG. 1 depicts an exemplary client-server environment that may be utilized with techniques presented herein. One or more user device(s) 105, one or more authorized repository system(s) 110, and/or one or more unauthorized repository system(s) 115 may communicate across an electronic network 120. The systems of FIG. 1 may communicate in any arrangement. As will be discussed herein, one or more detection system(s) 125 may communicate with the user device 105, the authorized repository system 110, and/or the unauthorized repository system 115 over the electronic network 120 in order to detect a security status of the user device 105.

The user device 105 may be a computer system such as, for example, a desktop computer, a mobile device, etc. In an exemplary embodiment, the user device 105 is a cellphone, or the like. In some embodiments, the user device 105 may have an operating system with a formerly compromised security status, e.g., the user device 105 may have been previously jailbroken, and then the jailbreak was reverted in order to restore the user device 105 to an un-compromised security status.

In some embodiments, an electronic application is installed on a memory of the user device 105. In some embodiments, the electronic application is associated with an entity that is also associated with the detection system 125. In some embodiments, the electronic application is not associated with the entity associated with the detection system 125.

As used herein, an "authorized repository" system generally encompasses systems associated with entities that provide and/or are associated with electronic applications. Examples of an authorized repository system 110 may include an application marketplace, storage system, program library, electronic development space, or the like that has been authorized by an entity associated with the user device 105 and/or the operating system of the user device 105 to make and/or distribute electronic applications. In some embodiments, the electronic application is associated with the authorized repository system 110.

As used herein, an "unauthorized repository" system generally encompasses systems associated with files and/or applications that are not authorized for installation on the user device 105 and/or the operating system on the user system 105. In some embodiments, a file or files associated with an unauthorized electronic application are associated with the unauthorized repository system 115, as discussed in further detail below.

In various embodiments, the electronic network 120 may be a wide area network ("WAN"), a local area network ("LAN"), personal area network ("PAN"), or the like. In some embodiments, electronic network 120 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web"). In some embodiments, the electronic network 120 includes or is in communication with a telecommunications network, e.g., a cellular network.

The detection system 125 may be configured to detect a security status of the user device 105, and in particular whether the security status was formerly compromised, as discussed in further detail below. While FIG. 1 depicts the various systems as physically separate and communicating across network 120, in various embodiments features of certain systems, such as the detection system 125, may be incorporated partially or completely into any of the other systems of FIG. 1. For example, at least a portion of the detection system 125 may be incorporated by the user device 105 and/or the authorized repository system 110. In an exemplary embodiment, at least a first portion of the detection system 125 may be integrated into or installed on the user device 105, e.g., as an electronic application, an executable file or process, or the like. In some embodiments, the at least first portion of the detection system 125 is integrated into the operating system. In some embodiments, a second portion of the detection system 125 is located on a server system in communication with the user device 105 via the electronic network 120.

In an exemplary use case, a first portion of the detection system 125 may be embodied as client software installed on the user device 105 that is configured to run prior to execution of the electronic application and/or prior to a particular resource utilized by the electronic application being accessed. The client software may be configured to generate a device fingerprint that may be uniquely associated with the user device 105, and that may be indicative of various aspects of the user device 105, the user, and/or a history of the user's use of the user device 105. The device fingerprint may include the determined security status of the user device 105. The second portion of the detection system 125 may be embodied as server software installed on a server device remote from the user device. The server software may be configured to determine a level of confidence in the user device 105 based on the device fingerprint, compare the determined level of confidence with a predetermined confidence threshold, and selectively permit and restrict access to various features of the electronic application based on the comparison.

In some embodiments, the client software is a thin client having no user interface and/or no indication of a presence of the software client on the user device 105. In some embodiments, the device fingerprint may be generated and/or updated over time, and the level of confidence for the user device may be determined based on a change in the device fingerprint. In some embodiments, generation of the device fingerprint, the level of confidence, and/or the comparison with the predetermined confidence threshold includes employment of a machine learning model, e.g., a machine learning model configured to identify anomalies arising in a device fingerprint over time.

Figure 2:
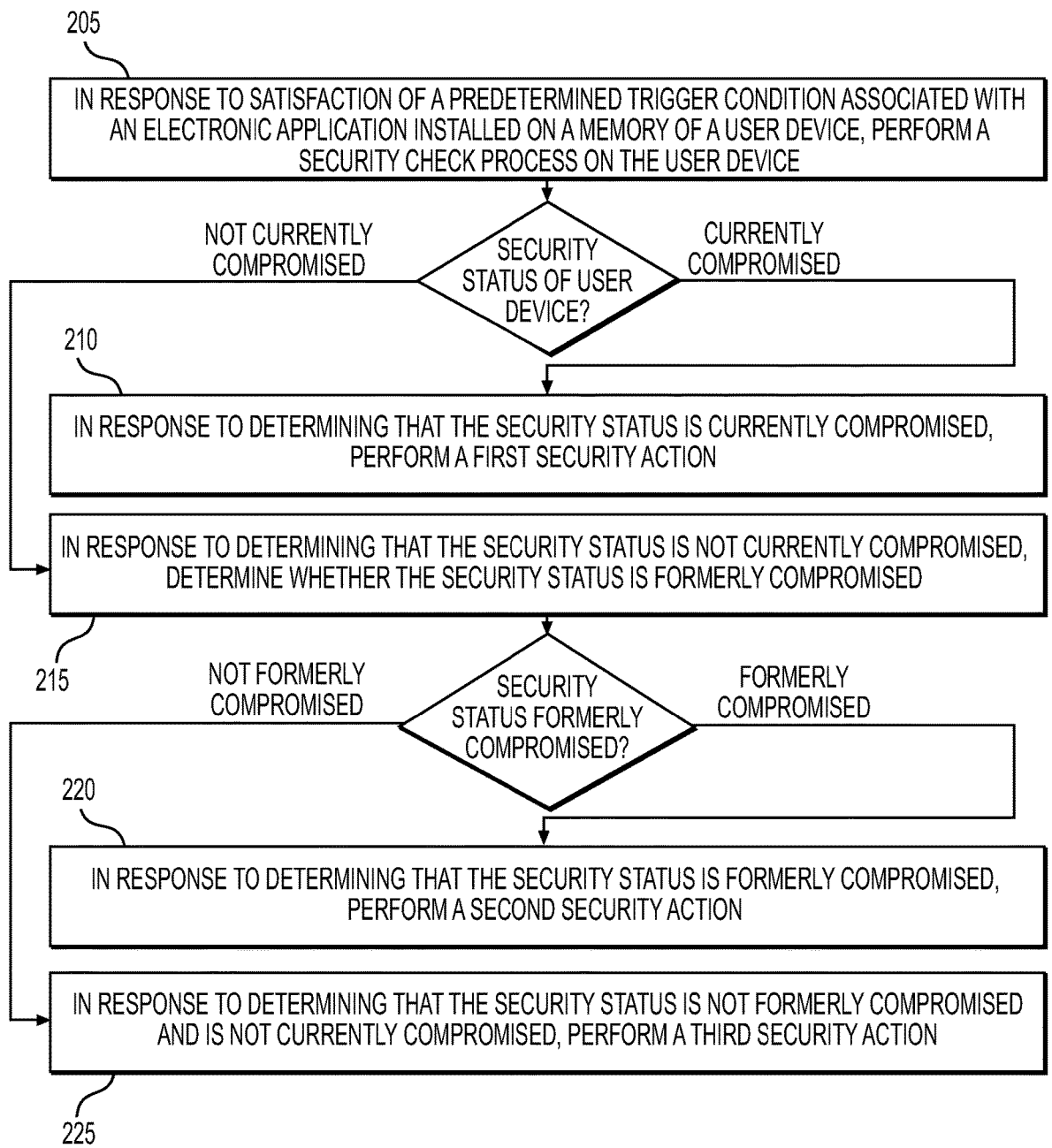
FIG. 2 depicts an exemplary process for detecting a security status of a computer system that includes performing a security check process.

FIG. 2 illustrates an exemplary process for detecting a security status of the user device 105 according to the technologies presented herein. At step 205, in response to satisfaction of a predetermined trigger condition associated with an electronic application installed on a memory of the user device 105, the detection system 125, e.g., the first portion of the detection system 125 installed on the memory of the user device 105, may perform a security check process on the user device 105. The security check process may, for example, determine a current and/or former security status of the user device 105. At step 210, in response to the security check process determining that the security status of the user device 105 is currently compromised, the detection system 125 may perform a first security action. Or, at step 215, in response to the security check process determining that the security status of the user device 105 is not currently compromised, the detection system 125 may, via the security check process, determine whether the security status is formerly compromised. At step 220, in response to the security check process determining that the security status is formerly compromised, the detection system 125 may perform a second security action. Or, at step 225, in response to the security check process determining that the security status is not currently compromised and is not formerly compromised, the detection system 125 may perform a third security action. Each of these steps is discussed in further detail below.

With regard to step 205, the predetermined trigger condition may include any acceptable criteria. In some embodiments, the predetermined trigger condition is satisfied in response to a criterion, any one of a plurality of criteria, and/or a combination of more than one of the plurality of criteria. A criterion for the predetermined trigger may include, for example, the user device 105 receiving a launch application instruction associated with the electronic application, a determination that a timer has expired, or the user device 105 receiving an application security check instruction, e.g., from a server system of the detection system 125 remote from the user device 105 and/or a server system associated with the electronic application such as the authorized repository system 110.

In some embodiments, the launch application instruction may be received from a user associated with the user device 105, e.g., via an interface of the user device 105. In some embodiments, the launch application instruction may be received from the operating system of the user device 105 and/or another electronic application executed on the user device 105. In some embodiments, the launch application instruction may be received from another system via the electronic network 120. In some embodiments, the electronic application may be self-executing, e.g., may be configured to cause itself to be executed.

In some embodiments, the timer may be indicative of a countdown of a period of time since a previous performance of the security check process. In some embodiments, the timer may be indicative of a countdown of a period of time since the electronic application was executed. In some embodiments, the timer may be indicative of a countdown of a period of time since the user device 105 was booted up and/or turned on. In some embodiments, the timer may be indicative of a countdown of a period of time since the user device 105 and/or the electronic application was last updated. In some embodiments, the timer may be indicative of a countdown of a period of time since a security application, e.g., an anti-virus or anti-malware application, has been executed. In some embodiments, rather than a countdown, the timer may be expressed by a record of a date and/or time of a previous event (e.g., execution of the electronic application, a boot-up of the user device 105, etc.) compared with a current date and/or time. In some embodiments, the timer is executed and/or expressed via the detection system 125, e.g., the first portion of the detection system 125 installed on the user device 105.

In some embodiments, the server system associated with the electronic application may transmit the application security check instruction at regular intervals. In some embodiments, the server system associated with the electronic application may transmit the application security check instruction in response to one or more criteria such as, for example, the server system receiving a transmission from another user device 105 indicative of a current or former compromise to the security status of the other user device 105. In some embodiments, the server system associated with the electronic application may transmit the application security check instruction based on an analysis process performed on traffic between the server system and the user device 105. For example, the analysis process of the server system may determine that a transmission from the user device 105 included unexpected, incorrect, or missing information.

Figure 3:
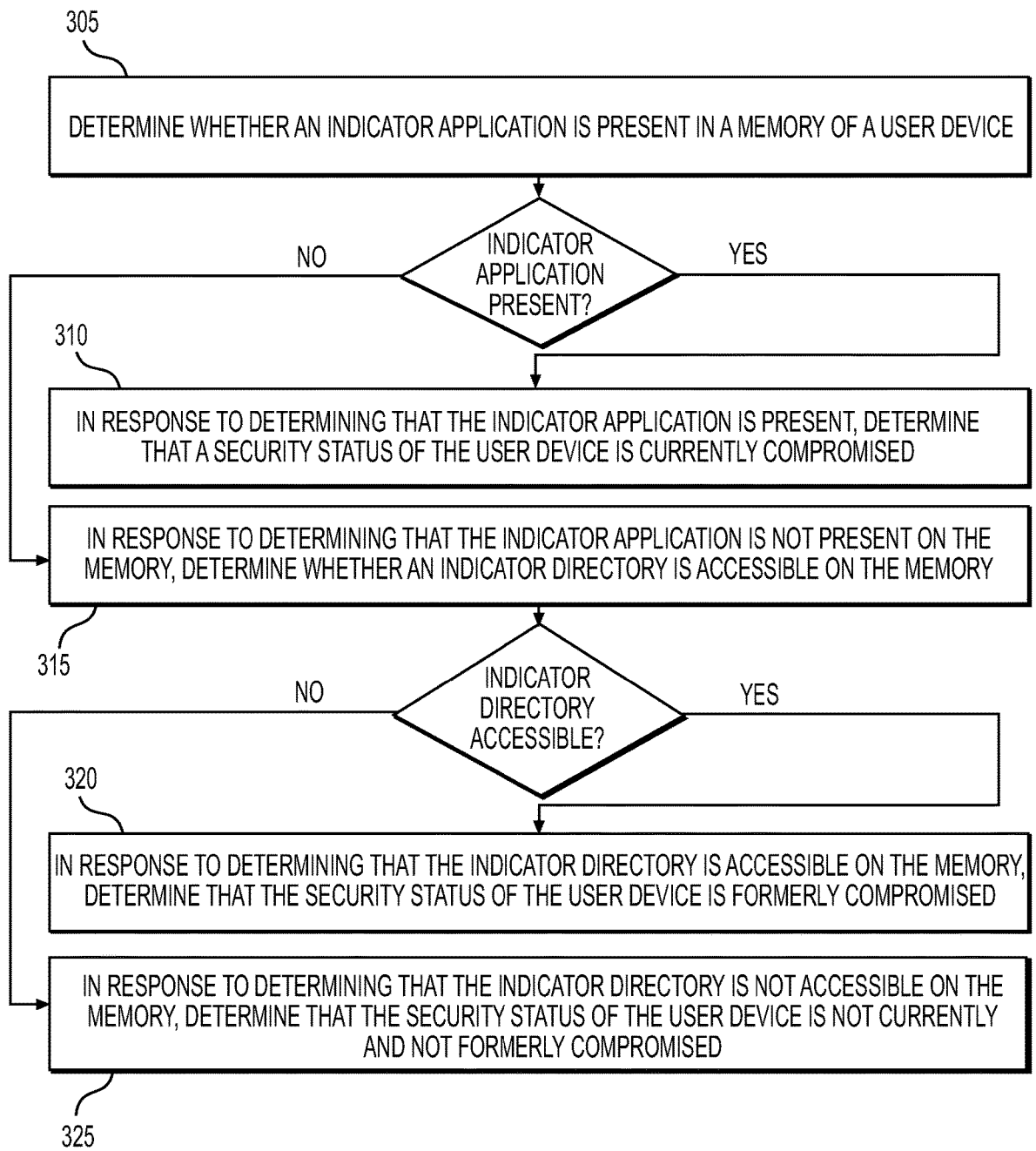
FIG. 3 depicts an exemplary process for performing the security check process from FIG. 2.

With regard to step 210, FIG. 3 illustrates an exemplary process for performing the security check process. At step 305, the detection system 125 may determine whether an indicator application is present in the memory of the user device 105. At step 310, in response to determining that the indicator application is present on the memory, the detection system 125 may determine that the security status of the user device 105 is currently compromised. Or, at step 315, in response to determining that the indicator application is not present on the memory, the detection system 125 may determine whether an indicator directory is accessible on the memory. At step 320, in response to determining that the indicator directory is accessible on the memory, the detection system 125 may determine that the security status of the user device 105 is formerly compromised. Or, at step 325, in response to determining that the indicator directory is not accessible on the memory, the detection system 125 may determine that the security status of the user device 105 is not currently and not formerly compromised. Each of these steps is discussed in further detail below.

With regard to step 305, it should be understood that, while the exemplary method above may include determining that a computer system is currently compromised (e.g., is jail broken) based on whether an indicator application is present in a memory of the computer system, any acceptable process for determining that the computer system is currently compromised may be used in various embodiments. As used herein, an "indicator application" is an electronic application that the presence of which is indicative that the security status of a computer system is compromised. As noted above, the operating system of many computer systems such as mobile devices may be a closed platform in which only authorized applications may be installed. Generally, each authorized application includes a unique identifier indicative that the application is authorized for installation. The presence of an unauthorized application, e.g., an electronic application without a corresponding unique identifier may thus be indicative that the security status of the computer system is compromised. Moreover, a closed platform generally only enables electronic applications to be installed from an authorized source, e.g., the authorized repository system 110. A record of a communication with the unauthorized repository system 115 and/or the presence of an electronic application known and/or configured to communicate with the unauthorized repository system 115 may also be indicative that the security status of the computer system is currently compromised.

In some embodiments, determining whether the indicator application is present in the memory may include performing a search process on the memory of the user device 105 to identify one or more files associated with the indicator application. The presence of such a file may be indicative of the presence of the indicator application itself. A file associated with the indicator application may include a file with a name associated with the indicator application, a file that includes a reference to the indicator application, a file predetermined to have an association with the indicator application, or the like.

In some embodiments, performing the search process on the memory may include using a file manager protocol of the operating system of the user device 105. Generally, an operating system includes a file manager protocol usable by electronic applications to access various files in the memory. In some instances, however, e.g., when the security status of a computer system is compromised, the file manager protocol may also be compromised. In an example, a malicious modification may prevent the file manager protocol of the operating system from identifying files associated with the indicator application that may be present on the memory.

In some embodiments, performing the search process on the memory may include using low-level input-output functions of the user device 105. Low-level functions, in contrast with a protocol that is included with the operating system, generally operate within a computer system at a level below the visibility of electronic applications installed via the operating system. For example, in some embodiments, a protocol utilizes an application program interface (API) to execute instructions, whereby a low-level function may operate without the use of an API. In some embodiments, by using such low-level functions, the search process may circumvent a malicious modification to the file manager protocol of the operating system. In some embodiments, performing the search process on the memory may include using the file manager protocol to perform a search for files associated with the indicator application and, in response to not finding any files associated with the indicator application using the file manager protocol, using the low-level input-output functions to perform another search for files associated with the indicator application.

In some embodiments, determining whether the indicator application is present in the memory may include attempting to open a universal resource locator ("URL") associated with the indicator application. In some instances, an operating system on a computer system enables the use of a URL to execute an electronic application on the computer system. The detection system 125 being able to use the URL associated with the indicator application may be indicative of the presence of the indicator application on the user device 105. In some embodiments, determining whether the indicator application is present on the memory may include attempting to execute the indicator application.

In an exemplary embodiment, the user device 105 is a mobile device (e.g., a cellular phone) that is running the iOS® operating system, and thus is only configured to allow electronic applications to be installed that are authorized, and that are retrieved from the Apple® App Store. In this embodiment, the user device 105 includes an electronic application that is predetermined to be associated with a compromised security status (e.g., "cydia.app" "sileo.app" or any other electronic application that may be associated with jailbreaking or the like), and thus is an indicator application. In response to a trigger condition being satisfied, e.g., a request from the user to execute the electronic application, the detection system 125 performs the security check process. The security check process proceeds to determine whether the electronic application associated with jailbreaking is present on the user device 105 by one or more of performing a search on the memory of the user device 105 for files associated with jailbreaking electronic application, or attempting to launch the jailbreaking electronic application and/or using a URL associated with the jailbreaking electronic application. In response to determining that the electronic application associated with jailbreaking is present on the user device 105, the security check process determines that the security status of the user device 105 is currently compromised (e.g., at step 310).

With regard to step 315, as noted above, in a jailbroken device with a compromised security system, files and/or directories that may otherwise have been inaccessible and/or invisible without an appropriate access or permission may be accessed or viewed by the user and/or electronic applications on the jailbroken device. However, when a jailbreak is reverted, such access and/or visibility is generally revoked. Surprisingly, it has been discovered that certain files and/or directories that were inaccessible and/or invisible in a never jailbroken device but that were accessible and/or visible in a jailbroken device remain accessible and/or visible even after the jailbreak of the device is reversed. Thus, a determination, e.g., via a search process, of a visibility and/or accessibility of such files or directories on a computer system may be indicative that the computer system has, at one time, been jail broken, and thus such files and/or directories are indicator files and indicator directories, respectively. More particularly, such visibility and/or accessibility in conjunction with a determination that the computer system is not currently jail broken (e.g., by determining that an indicator application is not present, or the like) may be indicative that the computer system is formerly jail broken, e.g., has a security status of formerly compromised (e.g., at step 320).

In some embodiments, the detection system 125 may include a list with at least one predetermined indicator directory and/or indicator file. In some embodiments, the detection system 125 may perform a first search process on the memory of a test device to identify files and directories that are accessible and/or visible, may perform a jailbreak of the test device, may perform a second search process on the memory of a test device to identify files and directories that are accessible and/or visible, and may identify indicator files and/or directories based on a comparison of the first search process and the second search process.

In an exemplary embodiment, the user device 105 is a mobile device (e.g., a cellular phone) that is running the iOS® operating system. In this exemplary embodiment, the memory of the user device 105 includes two indicator directories:

"/etc/apt" and "/private/var/lib/apt/". It should be understood that other indicator directories and/or files, as well as other numbers of indicator directories and/or files may be present in various embodiments. In response to a trigger condition being satisfied, e.g., a request from the user to execute the electronic application, the detection system 125 performs the security check process. The security check process proceeds to determine that the cydia.app, sileo.app, or the like is not present on the user device 105. In response to such determination, the security check process determines whether an indicator directory is present (e.g., visible and/or accessible) on the user device 105. In response to identifying the two indicator directories "/etc/apt" and "/private/var/lib/apt/," the security check process determines that the security status of the user device 105 is formerly compromised (e.g., at step 320).

With regard to step 325, the lack of an indicator application and the lack of an indicator directory and/or file may be indicative that a computer system not only is not currently compromised, but also that the computer system has not been formerly compromised. Thus, the detection system 125, via the security check process, may be able to determine whether a computer system is formerly compromised, currently compromised, or neither.

The determination(s) of the security status may be beneficial. For example, information associated with such a determination may be usable to monitor where, when, and how computer systems and/or the electronic application may become compromised. Such information may be usable to protect an integrity of the electronic application, e.g., by quarantining a compromised computer system and/or transmissions with the compromised system. Such information may be usable to address a vulnerability in the computer system and/or the electronic application. Thus, with reference again to FIG. 2, with regard to steps 210, 220, and 225, in response to the determination of the security status of the user device 105 by the security check process, the detection system 125 may perform a respective security action corresponding to the determined security status.

A "security action" generally encompasses any acceptable action taken in response to identification of a security status. In some embodiments, the security action(s) performed in response to an identification of a respective security status are different from each other. For example, in some embodiments, a first security action in response to identification of a currently compromised security status may include an act such as preventing a compromised file from being accessed or executed, terminating the electronic application or preventing the electronic application from being executed, issuing a quarantine of the computer system and/or the electronic application, and/or retrieving information that may be used to mitigate the compromise to the security status. In some embodiments, a second security action in response to identification of a formerly compromised security status may include an act such enabling access to a first portion of a functionality of the electronic application while also limiting or preventing access to a second portion of the functionality of the electronic application, limiting access and/or visibility of files associated with the electronic application, issuing an at least partial quarantine of the computer system and/or the electronic application, and/or retrieving information that may be used to mitigate the compromise to the security status. In some embodiments, a third security action in response to identification of a formerly compromised security status may include an act such as determining whether the security status was previously identified as either currently or formerly compromised, allowing execution of the electronic application, or the like.

In some embodiments, one or both of the first security action and the second security action includes causing the user device 105 to transmit a report message to a server system of the detection system 125 that is remote from the user device 105. For example, in some embodiments, the report is or includes a device fingerprint for the user device 105. Such a report message may include information associated with the security status of the user device 105, e.g., information associated with one or more of the indicator application, the indicator directory or file, or the like.

In some embodiments, the detection system 125 may track and/or record information associated with the security status of the user device 105 over time. For example, the detection system 125 may store the determination of the security status of the user system 105 by the security check process each time the security check process is performed. In another example, the detection system 125 may track the device fingerprint of the user device 105 over time, and may determine an anomaly in the device fingerprint indicative of a compromise in security based on the tracking over time.

In some instances, a user may jailbreak a user device 105, and then the user device 105 may be restored to an initial, uncompromised state (e.g., a "factory reset"). After a factory reset, the user device may be in a condition similar or identical to an initial, not formerly compromised state, and thus a factory reset device may appear to be a device that has never been compromised, even if the device were previously compromised prior to the factory reset. Thus, in some embodiments, a first determination that the user device 105 is currently or formerly compromised, followed by a second determination that the user device 105 is neither formerly nor currently compromised may be indicative that the user device 105 has been factory reset into an initial uncompromised condition. In some embodiments, however, a first determination that the user device 105 is currently or formerly compromised, followed by a second determination that the user device 105 is neither formerly nor currently compromised may instead be indicative that the security check process has been circumvented. For example, if the security check process has been circumvented, the user device 105 may appear to have been never formerly compromised, despite that the user device 105 has not been factory reset into an uncompromised state.

In some embodiments, a security action e.g., the first and/or second security action, may include causing the detection system 125 to associate the user and/or the user device 105 with a potential for security compromise. In other words, a determination that the user device 105 is or has been compromised may be indicative that the user and or user device 105 represents a relatively higher risk of compromise, relative to other users and devices. Such association may be stored, for example, on the server system of the detection system 125 remote from the user device 105. In some embodiments, the third security action includes determining whether the user and/or the user device 105 includes an association with a potential for a compromise. In some embodiments, in response to such a determination, the detection system 125 may perform another security action, e.g., the first and/or second security action.

In some embodiments, e.g., in response to the report message and/or in response to determining that the security check process has been circumvented, the detection system 125 may block or quarantine transmissions to and/or from the user device 105 and/or the electronic application. For example, in response to a report message indicating that the user device 105 is or was compromised, the detection system 125 may cause a server system associated with the electronic application from receiving and/or responding to requests transmitted by the user device 105.

In some embodiments, performing the security action may only include performing actions that are not visible to the user. For example, in some instances, the user may have intentionally attempted to maliciously attack the user device 105 and/or the electronic application. If the user becomes aware that the code injection has been detected, the user may attempt to develop or employ a method of attack that may not be detectable. By, for example, transmitting the report message to the server system of the detection system 125 without making the user aware of the detection of the compromise to the security status of the user device 105, the detection system 125 may enable the entity associated with the detection system 125 to develop a protection or mitigation for the compromise before the user may have had time to develop or employ an undetectable attack.

Figure 4:
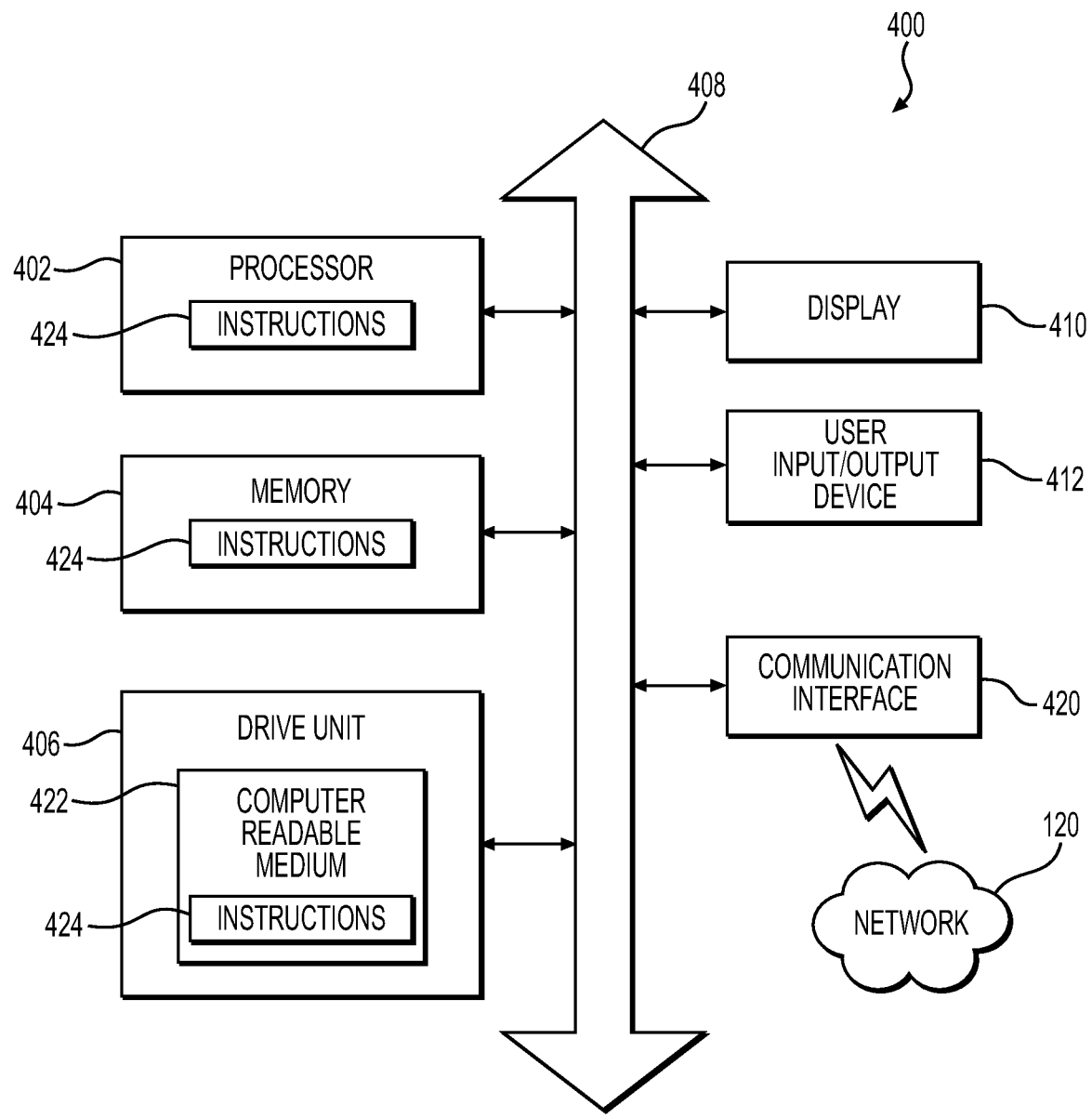
FIG. 4 depicts an example of a computing device, according to aspects of the present disclosure.

FIG. 4 is a simplified functional block diagram of a computer 400 that may be configured as a device for executing the methods of FIGS. 2 and 3, according to exemplary embodiments of the present disclosure. FIG. 4 is a simplified functional block diagram of a computer that may be configured as the detection system 125 and/or the user device 105 according to exemplary embodiments of the present disclosure. Specifically, in one embodiment, any of the mobile devices, systems, servers, etc., discussed herein may be an assembly of hardware 400 including, for example, a data communication interface 420 for packet data communication. The platform also may include a central processing unit ("CPU") 402, in the form of one or more processors, for executing program instructions. The platform may include an internal communication bus 408, and a storage unit 406 (such as ROM, HDD, SDD, etc.) that may store data on a computer readable medium 422, although the system 400 may receive programming and data via network communications. The system 400 may also have a memory 404 (such as RAM) storing instructions 424 for executing techniques presented herein, although the instructions 424 may be stored temporarily or permanently within other modules of system 400 (e.g., processor 402 and/or computer readable medium 422). The system 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-3, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for detecting a security status of a computer system, comprising:
   in response to satisfaction of a predetermined trigger condition associated with an electronic application installed on a memory of the computer system, performing a security check process on the computer system, wherein the security check process includes:
      in response to determining that an indicator application is not present on the memory, determining whether an indicator directory is accessible in the memory by performing a search process on the memory to identify at least two indicator directories in the memory, wherein:
         the at least two indicator directories includes "etc/apt" and "/private/var/lib/apt/"; and
         the search process identifies that at least the indicator directories "/etc/apt" and "/private/var/lib/apt/" are accessible on the memory; and
      in response to determining that at least the indicator directories "/etc/apt" and "/private/var/lib/apt/" are accessible on the memory, determining that the security status of the computer system is formerly compromised; and
   in response to the security check process determining that the security status is formerly compromised, performing a security action.

2. The computer-implemented method of claim 1, wherein the security action includes:
   enabling access to a first portion of a functionality of the electronic application, and
   preventing access to a second portion of the functionality of the electronic application.

3. The computer-implemented method of claim 2, wherein the security action further includes transmitting a report message to a server system associated with the electronic application that includes information associated with the security status of the computer system.

4. The computer-implemented method of claim 1, wherein the predetermined trigger condition includes one or more of:
   receiving a launch application instruction associated with the electronic application;
   determining that a timer has expired; or
   receiving an application security check instruction from a server system associated with the electronic application.

5. A system for detecting a security status of a computer system, the system comprising:
   a memory storing instructions and an electronic application; and
   a processor operatively connected to the memory and configured to execute the instructions to perform acts, the acts including:
      in response to satisfaction of a predetermined trigger condition associated with the electronic application installed on the memory of the computer system, performing a security check process on the computer system, wherein the security check process includes:
         in response to determining that an indicator application is not present on the memory, determining whether an indicator directory is accessible in the memory by performing a search process on the memory to identify at least two indicator directories in the memory, wherein:
            the at least two indicator directories includes "/etc/apt" and "/private/var/lib/apt/"; and
            the search process identifies that at least the indicator directories "/etc/apt" and "/private/var/lib/apt/" are accessible on the memory; and
         in response to determining that at least the indicator directories "/etc/apt" and "/private/var/lib/apt/" are accessible on the memory, determining that the security status of the computer system is formerly compromised; and
      in response to the security check process determining that the security status is formerly compromised, performing a security action.

6. The system of claim 5, wherein the security action includes:
   enabling access to a first portion of a functionality of the electronic application, and
   preventing access to a second portion of the functionality of the electronic application.

7. The system of claim 6, wherein the security action further includes transmitting a report message to a server system associated with the electronic application that includes information associated with the security status of the computer system.

8. The system of claim 5, wherein the predetermined trigger condition includes one or more of:

receiving a launch application instruction associated with the electronic application;

determining that a timer has expired; or receiving an application security check instruction from a server system associated with the electronic application.

9. A non-transitory computer-readable medium comprising instructions that are executable by at least one processor of a computer system to perform operations for detecting a security status of the computer system, the operations including:
    in response to satisfaction of a predetermined trigger condition associated with an electronic application installed on a memory of the computer system, performing a security check process on the computer system, the security check process including:
        in response to determining that an indicator application is not present on the memory, determining whether an indicator directory is present on the memory of the computer system by performing a search process on the memory to identify at least two indicator directories in the memory, wherein:
            the at least two indicator directories include "etc/apt" and "/private/var/lib/apt/"; and
            the search process identifies that at least the indicator directories "/etc/apt" and "/private/var/lib/apt/" are accessible on the memory; and
        in response to determining that at least the indicator directories "/etc/apt" and "/private/var/lib/apt/" are accessible on the memory, determining that the security status of the computer system is formerly compromised; and
    in response to the security check process determining that the security status is formerly compromised, performing a security action.

* * * * *